US012406393B2

(12) United States Patent
Okumura et al.

(10) Patent No.: US 12,406,393 B2
(45) Date of Patent: Sep. 2, 2025

(54) TARGET DETECTION METHOD AND DETECTION DEVICE

(71) Applicants:AISIN SHIROKI CORPORATION, Fujisawa (JP); TAMADIC Co., Ltd., Tokyo (JP); Shinya HIRANO, Nisshin (JP); TACT SYSTEM Co., Ltd., Komaki (JP)

(72) Inventors: Yu Okumura, Fujisawa (JP); Naofumi Matsushita, Fujisawa (JP); Junya Nakamura, Fujisawa (JP); Tomokazu Uchiyama, Fujisawa (JP); Shinji Fujino, Tokyo (JP); Motohiro Kakureya, Tokyo (JP); Kohei Yagi, Tokyo (JP); Shinya Hirano, Nisshin (JP); Hitoshi Fujiyama, Komaki (JP)

(73) Assignees: AISIN SHIROKI CORPORATION, Fujisawa (JP); TAMADIC Co., Ltd., Tokyo (JP); Shinya Hirano, Aichi-ken (JP); TACT SYSTEM Co., Ltd., Aichi-ken (JP)

( * ) Notice: Subject to any disclaimer, the term of this patent is extended or adjusted under 35 U.S.C. 154(b) by 315 days.

(21) Appl. No.: 18/124,075

(22) Filed: Mar. 21, 2023

(65) Prior Publication Data

US 2023/0306634 A1 Sep. 28, 2023

(30) Foreign Application Priority Data

Mar. 24, 2022 (JP) ................................ 2022-048767

(51) Int. Cl.
*G06T 7/73* (2017.01)
(52) U.S. Cl.
CPC ................. *G06T 7/74* (2017.01); *G06T 7/75* (2017.01); *G06T 2207/30164* (2013.01)

(58) Field of Classification Search
CPC ..... G06T 7/74; G06T 7/75; G06T 2207/30164; G06T 7/80; G06T 7/73; B25J 9/16;
(Continued)

(56) References Cited

U.S. PATENT DOCUMENTS 8,346,392 B2 * 1/2013 Walser .................. B25J 9/1697
700/259
11,577,398 B2 * 2/2023 Kokubo .................. B25J 19/00
(Continued)

FOREIGN PATENT DOCUMENTS

JP          5290324 B2    9/2013
JP       2022-048096 A    3/2022

*Primary Examiner* — Michael S Osinski
(74) *Attorney, Agent, or Firm* — Sughrue Mion, PLLC

(57) ABSTRACT

There is provided a target detection method and detection device that can detect a target by a simple method and configuration.
A target detection method includes: a step of, at a first position information generation device, measuring a position and a posture of a first target; a step of, at a second position information generation device, measuring the position and the posture of the first target; a step of calculating a position and a posture of one of the first position information generation device and the second position information generation device with respect to other one of the first position information generation device and the second position information generation device based on a difference between the position and the posture of the first target measured by the first position information generation device, and the position and the posture of the first target measured by the second position information generation device; and a step of, at the second position information generation device, measuring a position and a posture of a second target using the position and the posture of the one of the first position information generation device and the second position information generation device with respect (Continued)

to the other one of the first position information generation device and the second position information generation device.

7 Claims, 8 Drawing Sheets

(58) Field of Classification Search
 CPC ...... B25J 9/1664; B25J 9/1679; B25J 9/1697;
 B25J 9/1692; B25J 9/162; B25J 13/089;
 B23K 37/00; B23K 26/0884; B23K
 26/032; B23K 26/082; B23K 26/21;
 G01S 17/86; G01S 17/42; G01S 17/66;
 G01S 17/875; G05B 2219/39008; G05B
 2219/40298; G05B 2219/40611; G05B
 2219/45104
 See application file for complete search history.

(56) References Cited

U.S. PATENT DOCUMENTS

| | | | | |
|---|---|---|---|---|
| 11,656,357 B2* | 5/2023 | Pivac | ................. | G01B 9/02029 |
| | | | | 356/614 |
| 11,958,193 B2* | 4/2024 | Pivac | ................. | B25J 19/0025 |
| 12,240,105 B2* | 3/2025 | Talebi | ................. | B25J 9/1638 |
| 2010/0274390 A1 | 10/2010 | Walser et al. | | |
| 2012/0255938 A1* | 10/2012 | Oe | ................. | B23K 26/0884 |
| | | | | 901/41 |
| 2014/0288710 A1* | 9/2014 | Ikenaga | ................. | B25J 9/1692 |
| | | | | 901/47 |
| 2017/0067728 A1* | 3/2017 | Iwatake | ................. | G01B 21/04 |
| 2017/0151671 A1* | 6/2017 | Ishige | ................. | B25J 9/1692 |
| 2018/0202797 A1* | 7/2018 | Kawashima | ......... | G01B 11/022 |
| 2018/0300551 A1* | 10/2018 | Luccin | ................. | G06T 7/73 |
| 2019/0200000 A1* | 6/2019 | Kumagai | ........... | B23K 26/0884 |
| 2019/0224847 A1* | 7/2019 | Mori | ................. | B25J 9/1697 |
| 2020/0070282 A1* | 3/2020 | Takeda | ................. | G05B 13/0265 |
| 2020/0082564 A1* | 3/2020 | Kaczor | ................. | G06T 7/74 |
| 2020/0103249 A1* | 4/2020 | Zhou | ................. | G01S 17/86 |
| 2020/0149885 A1* | 5/2020 | Kamei | ................. | G01B 11/245 |
| 2020/0357134 A1* | 11/2020 | Lee | ................. | G06T 7/80 |
| 2020/0406464 A1* | 12/2020 | Kajiyama | ............. | B25J 9/1692 |
| 2022/0031276 A1* | 2/2022 | Watanabe | ............ | A61B 6/5258 |
| 2023/0083059 A1* | 3/2023 | Lemmer | ................. | G06T 11/005 |
| | | | | 378/62 |
| 2023/0130816 A1* | 4/2023 | Nakano | ................. | B25J 9/163 |
| | | | | 700/254 |
| 2023/0334764 A1* | 10/2023 | Lee | ................. | G06T 15/10 |
| 2023/0364812 A1* | 11/2023 | Takahashi | ................. | B25J 5/007 |
| 2024/0033910 A1* | 2/2024 | Nakada | ................. | B25J 9/1605 |
| 2024/0069178 A1* | 2/2024 | Røtvold | ................. | G01B 11/002 |
| 2025/0046012 A1* | 2/2025 | Zhang | ................. | G06T 17/00 |

* cited by examiner

TARGET DETECTION METHOD AND DETECTION DEVICE

TECHNICAL FIELD

The present invention relates to a target detection method and detection device.

BACKGROUND ART

Conventionally, there is known a technique that welds a workpiece with another workpiece while gripping the workpiece by an arm robot. In this case, a dedicated positioning mechanism (including a mold or a jig for positioning) is used to position (detect positions and postures of) not only the arm robot, but also the workpiece gripped by the arm robot. However, the positioning mechanism needs to be separately provided, and therefore equipment cost is high and a wide equipment installation space is necessary. Moreover, positioning mechanisms the number of which corresponds to the number of car models are necessary, and, therefore when the number of car models is large, the number of times of set-up changes becomes large, and a total set-up change time becomes longer. Furthermore, every time a new car model is launched, a similar problem occurs.

Patent Literature 1 describes a method for positioning at least one object at a final posture in a space by an industrial robot. This method uses a first industrial robot, a first optical imaging device, and at least one second optical imaging device to position the object. The first industrial robot can adjust the object to a predetermined position. The first optimal imaging device is calibrated in a three-dimensional spatial coordinate system, and is positioned at a known first position in a known direction. The second optimal imaging device is calibrated in the three-dimensional spatial coordinate system, and is positioned at a known second position in the known direction.

The first optical imaging device includes a first camera, a first driving unit, and a first angle measurement unit. The first camera is optically calibrated to capture an image in a predetermined first field of view. The first driving unit is a component that determines a direction of the first camera to adjust a position of the first field of view. The first angle measurement unit detects an angular direction of the first camera, and is calibrated in the spatial coordinate system for finding the first field of view in the spatial coordinate system.

The second optical imaging device includes a second camera, a second driving unit, and a second angle measurement unit. The second camera is optically calibrated to capture an image in a predetermined second field of view. The second driving unit is a component that determines a direction of the second camera to adjust a position of the second field of view. The second angle measurement unit detects an angular direction of the second camera, and is calibrated in the spatial coordinate system for finding the second field of view in the spatial coordinate system.

CITATION LIST

Patent Literature

Patent Literature 1: JP 5290324 B2

SUMMARY OF INVENTION

Technical Problem

However, according to Patent Literature 1, since devices required to position (detect a position and a posture of) an object are large-scale (the first optical imaging device (the first camera, the first driving unit, and the first angle measurement unit) and the second optical imaging device (the second camera, the second driving unit, and the second angle measurement unit)), and it cannot be said that a method for positioning (a method for detecting the position and the posture of) the object is also simple, there has been a room for improvement.

The present invention has been made based on an awareness of the above-described problem, and an object of the present invention is to provide a target detection method and detection device that can detect a target by a simple method and configuration.

Solution to Problem

A target detection method according to the present embodiment includes: a step of, at a first position information generation device, measuring a position and a posture of a first target; a step of, at a second position information generation device, measuring the position and the posture of the first target; a step of calculating a position and a posture of one of the first position information generation device and the second position information generation device with respect to other one of the first position information generation device and the second position information generation device based on a difference between the position and the posture of the first target measured by the first position information generation device, and the position and the posture of the first target measured by the second position information generation device; and a step of, at the second position information generation device, measuring a position and a posture of a second target using the position and the posture of the one of the first position information generation device and the second position information generation device with respect to the other one of the first position information generation device and the second position information generation device.

Advantageous Effects of Invention

According to the present invention, it is possible to provide a target detection method and detection device that can detect a target by a simple method and configuration.

DESCRIPTION OF EMBODIMENTS

Figure 1:
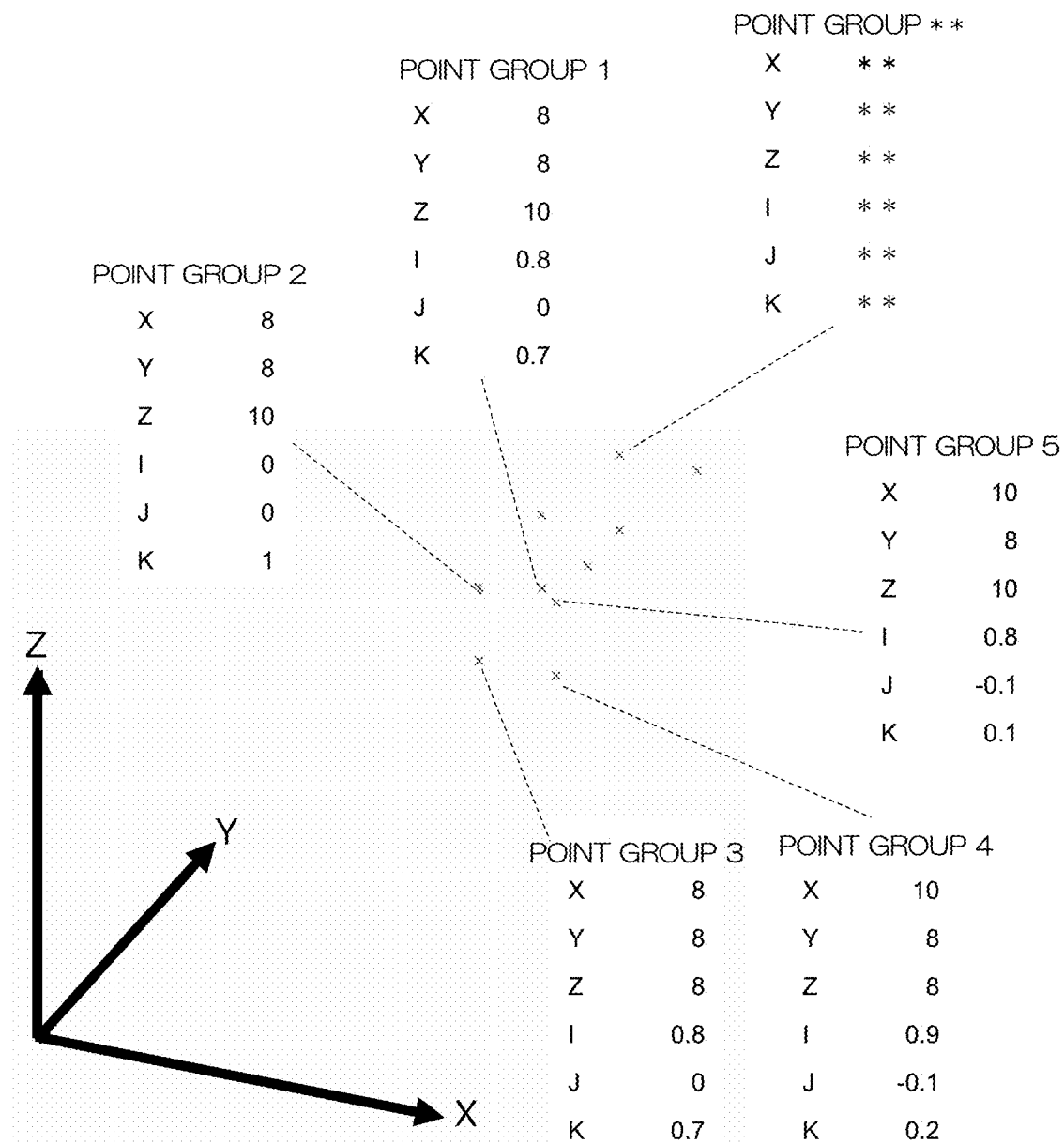
FIG. 1 is a view illustrating an example of an expression of each point information of point group data.

First, terms in this description are defined.

A "position information generation device (3D scanner)" in this description is a device that obtains shape information of workpieces (e.g., an upper sash, an upright column sash, a door frame, a bracket, or the like) and a grip device (e.g., a robot arm or the like) of the workpiece, and other targets (e.g., a robot arm, or a marker or a fixed object provided near the robot arm) as point group data. Each point information of the point group data can be read as "a position and a posture of a target". Each point information (the position and the posture of the target) of the point group data can be expressed as numerical values of coordinates X, Y, and Z whose origin is a 3D scanner origin, and normal directions I, J, and K of the coordinates X, Y, and Z. In this description, a "3D scanner" is also referred to as a "second position information generation device".

The "position information generation device (laser tracker)" in this description is, for example, a device that can calculate three-dimensional information (position information and an angle) of a target based on an own coordinate system of the position information generation device. The "position information generation device (laser tracker)" radiates, for example, laser light, and obtains three-dimensional position information of a target when the laser light reflected by the target returns to a light emission source. Three-dimensional information of a target (position information and an angle) can be read as "a position and a posture of a target". The "position information generation device (laser tracker)" has a wide measurement range, so that, if there are the "position information generation device (laser tracker)" and the target or a touch probe with a marker described later, it is possible to accurately calculate a dimension between each equipment, accuracy, an origin position, and the like. In this description, the "position information generation device (laser tracker)" is also referred to as a "first position information generation device".

The "marker" in this description is, for example, one type of a target for the first position information generation device (laser tracker) and the second position information generation device (3D scanner) to obtain position coordinates and angles. The position coordinates and the angles of the "marker" are calculated using the first position information generation device (laser tracker) or the second position information generation device (3D scanner) as an origin. The position coordinates and the angles can be expressed as the coordinates X, Y, and Z and angles Rx, Ry, and Rz, and the angles Rx, Ry, and Rz can be each expressed by 4×4 matrix data (matrix data) that uses unit vectors (I, J, and K) of change amounts from a reference X axis, a reference Y axis, and a reference Z axis, and movement amounts (X, Y, and Z) from a reference point as described later. The "marker" is attached to, for example, a grip part at a distal end of a robot arm, and is used to obtain, as a numerical value, operation accuracy of the robot arm (an absolute position of the grip part on a three-dimensional space) that uses the first position information generation device (laser tracker) or the second position information generation device (3D scanner) as the origin. Furthermore, the marker is additionally used widely for a touch probe with a marker for contacting and measuring a target workpiece as described later, a type of a marker attached to a 3D scanner for measuring a target workpiece without contact, or the like. For any measurement information, the marker is used for arranging a workpiece at the origin of the first position information generation device (laser tracker) or the second position information generation device (3D scanner).

The "touch probe with the marker" in this description refers to, for example, a touch probe that can calculate a position of a target workpiece on a three-dimensional space that uses the first position information generation device (laser tracker) or the second position information generation device (3D scanner) as the origin by making a probe distal end touch and measure the target workpiece in a state where the first position information generation device (laser tracker) or the second position information generation device (3D scanner) locks onto a target part of the "touch probe with the marker".

The "3D scanner with the marker" in this description can calculate point group information obtained by the second position information generation device (3D scanner) as the origin of the first position information generation device (laser tracker) from a marker origin coordinate/angle from the origin of the first position information generation device (laser tracker) and an origin coordinate/angle (described later) of the second position information generation device (3D scanner) from the marker origin by, for example, 3D-scanning a target workpiece in a state where, for example, the first position information generation device (laser tracker) locks onto a target part of the "3D scanner with the marker". As for a relationship between the marker origin position and the origin position of the second position information generation device (3D scanner), at a time of installation, position information of a reference block calculated by using the first position information generation device (laser tracker) and the touch probe with the marker, and position information of the reference block captured by the second position information generation device (3D scanner) are matched (calibrated) to calculate origin/angle information of the second position information generation device (3D scanner). Generally, the second position information generation device (3D scanner) has characteristics that accuracy lowers when an image capturing range is widened, and therefore is not suitable for capturing images in a wide range, and the second position information generation device (3D scanner) alone has a limitation for an operation of entire equipment described later. Therefore, a measure to use the first position information generation device (laser track) is taken to widen the image capturing range and a measurement range. However, as described later, by appropriately combining the first position information generation device (laser tracker) and the second position information generation device (3D scanner), the target detection method and detection device according to the present embodiment can use the first position information generation device (laser tracker) only for initial setting (calibration), and then correct a final position using the second position information generation device (3D scanner) and a shape marker. Consequently, for example, it is not necessary to equip the dedicated first position information generation device (laser tracker) with each of a plurality of manufacturing lines, and use the first position information generation device (laser tracker) between the plurality of manufacturing lines.

"Point group data" in this description means, for example, three-dimensional information of workpieces obtained by 3D-scanning the workpieces (by capturing images of the workpieces) (e.g., an upper sash, an upright column sash, a door frame, a bracket, and the like) using a device such as a 3D scanner (camera). Furthermore, as illustrated in, for example, FIG. 1, each point information of the point group data can be expressed as, for example, numerical values of the coordinates X, Y, and Z and the normal directions I, J, and K of the coordinates X, Y, and Z (FIG. 1). In an example in FIG. 1, a point group 1, a point group 2, a point group 3, a point group 4, a point group 5, and a point group ** are shown.

"Reference data" in this description means, for example, data (e.g., masterwork data, design value data, raw data, or CAD data) that serves as criteria for design of the workpieces (e.g., the upper sash, the upright column sash, the door frame, the bracket, and the like).

"Shape fitting point group data" in this description means point group data obtained by matching the above-described "point group data" with the "reference data".

Figure 2:
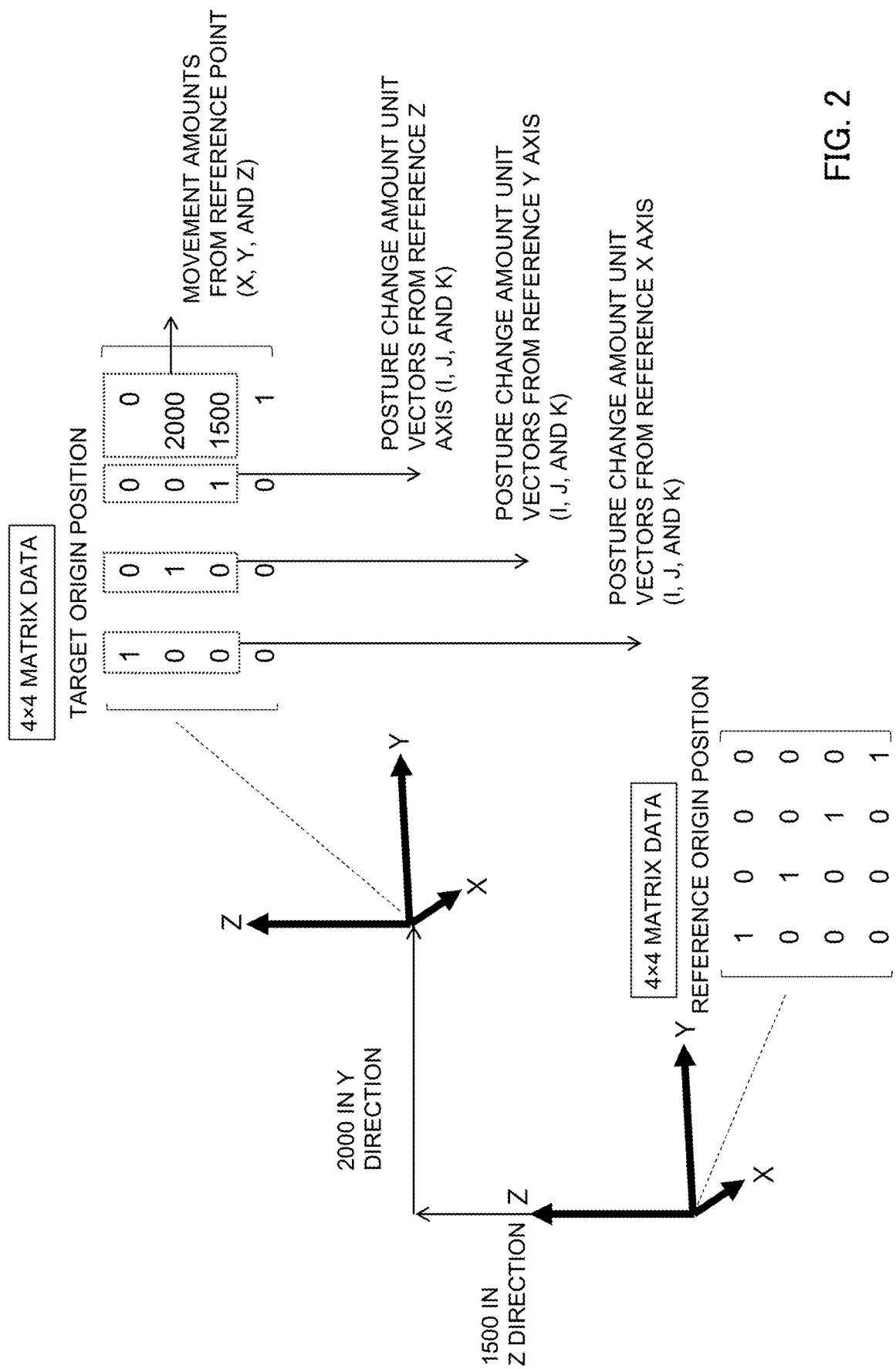
FIG. 2 is a view illustrating an example of an expression of an origin in a 4×4 matrix.

A "translation matrix" and an "inverse matrix" in this description are expressed by, for example, 4×4 matrix data (matrix data). As illustrated in, for example, FIG. 2, the "translation matrix" and the "inverse matrix" are expressed as information of the origin or a position from a reference origin to a certain target origin. A first column from the left indicates unit vectors (I, J, and K) of a posture change amount from the reference X axis, a second column from the left indicates unit vectors (I, J, and K) of the posture change amount from the reference Y axis, a third column from the left indicates unit vectors (I, J, and K) of the posture change amount from the reference Z axis, and a fourth column from the left indicates movement amounts (X, Y, and Z) from the reference point.

Figure 3:
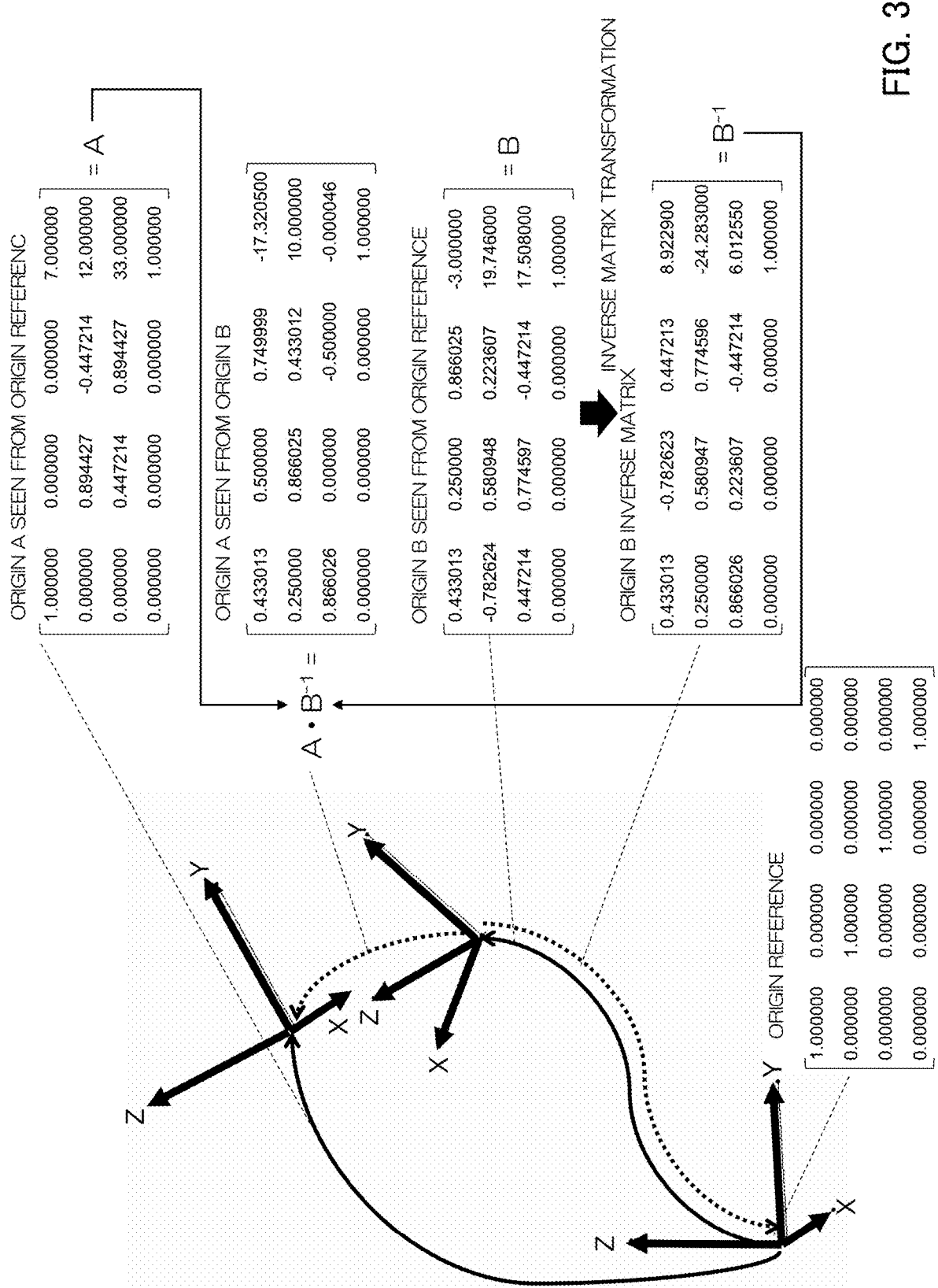
FIG. 3 is a view illustrating an example of origin calculation that uses the 4×4 matrix.

By using the matrix, it is possible to calculate the movement amount of each coordinate as illustrated in FIG. 3. By performing this matrix calculation, it is possible to calculate a quantity of a position/angle of each coordinate system. Movement for matching the above-described point group data with the reference data can be also expressed by 4×4 matrix data. Furthermore, by performing inverse matrix transformation on this 4×4 matrix data, it is also possible to output the 4×4 matrix data of the movement for matching the reference data with the point group data. In FIG. 3, an origin reference, an origin A seen from the origin reference, the origin A seen from an origin B, the origin B seen from the origin reference, and an inverse matrix of the origin B are each expressed by 4×4 matrix data.

Figure 4:
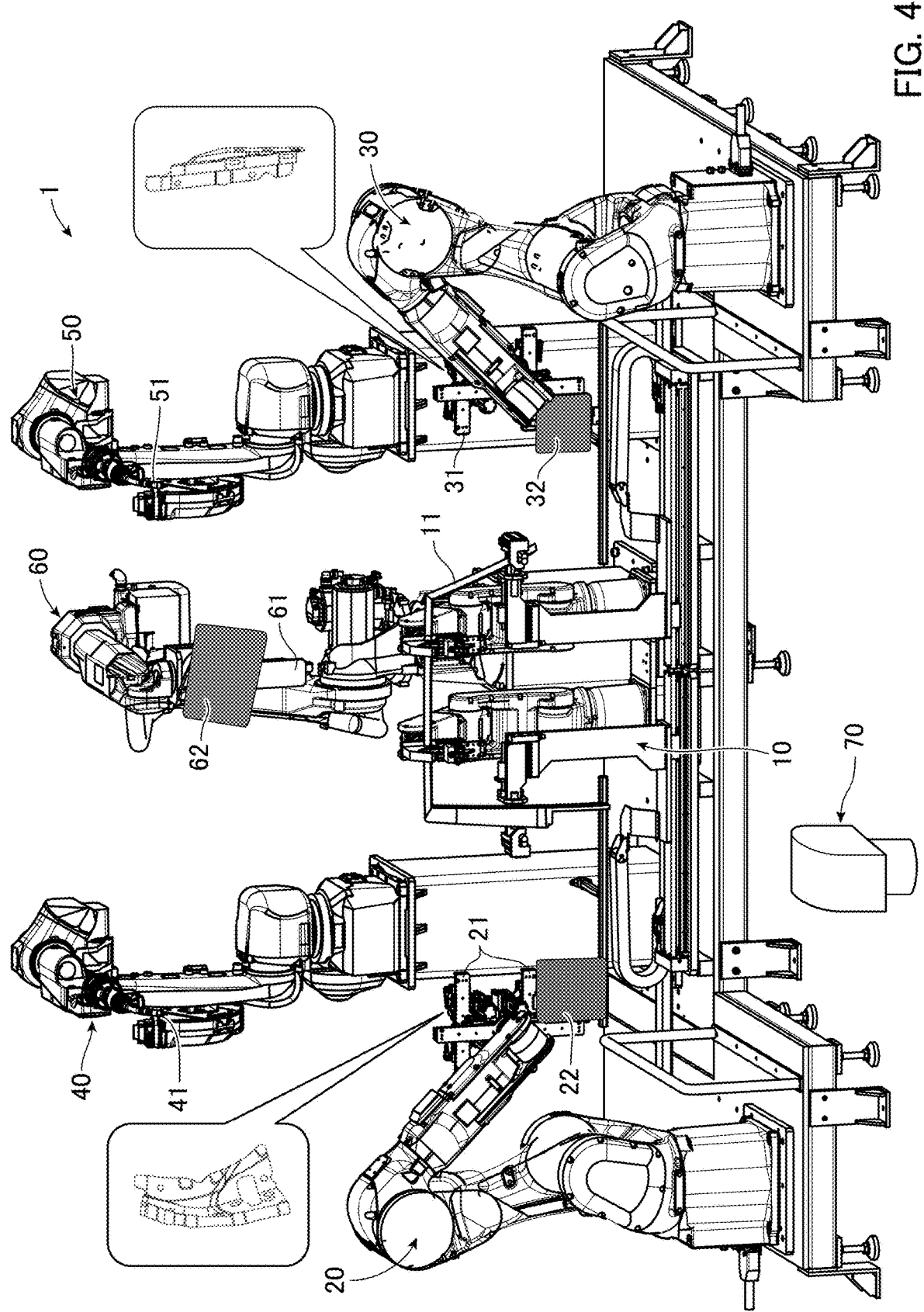
FIG. 4 is a view illustrating a first example of a configuration of a welding device for vehicle parts to which a target detection method and detection device according to the present embodiment are applied.
Figure 5:
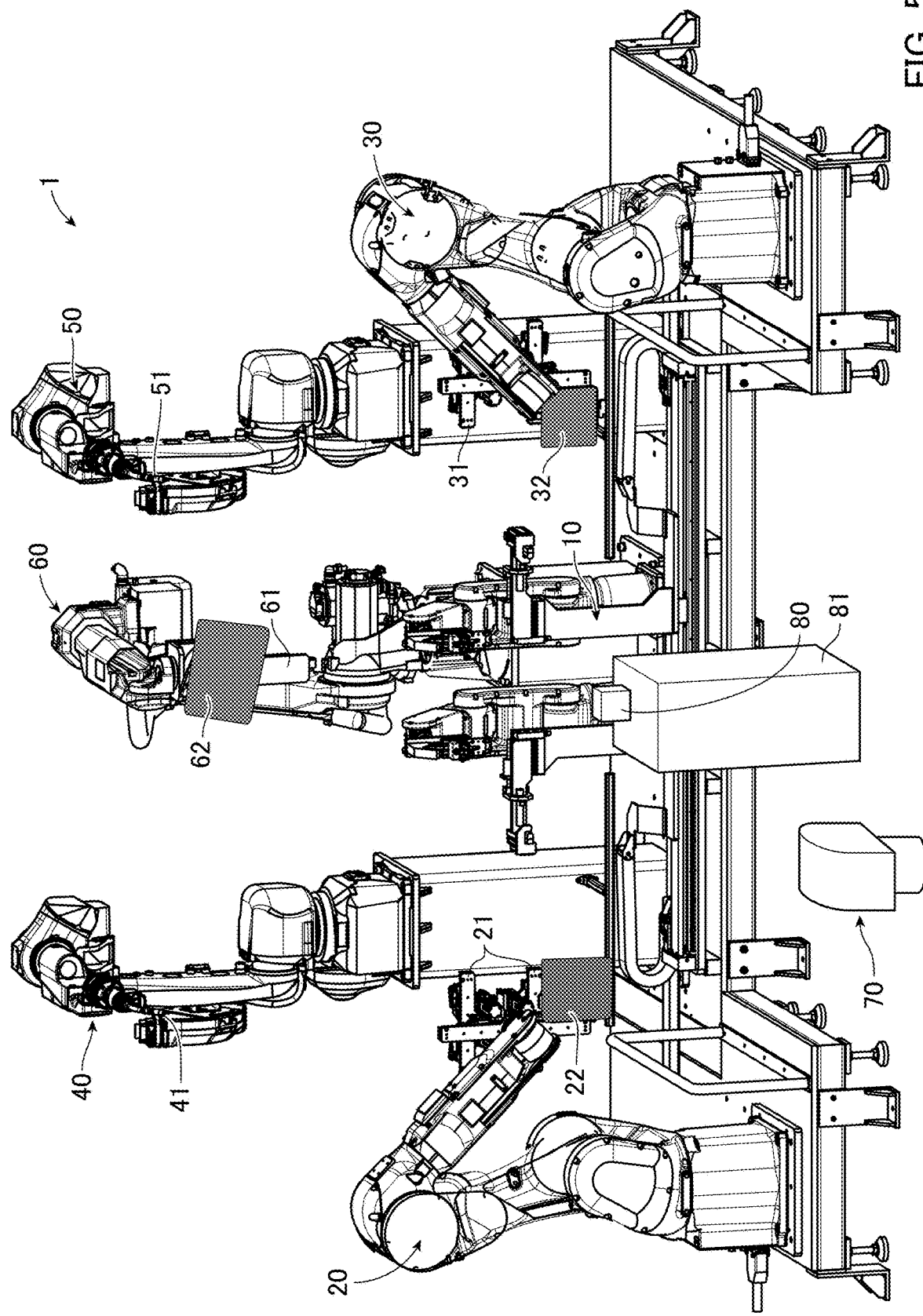
FIG. 5 is a view illustrating a second example of the configuration of the welding device for the vehicle parts to which the target detection method and detection device according to the present embodiment are applied.

FIGS. 4 and 5 are views illustrating first and second examples of a configuration of a welding device 1 for vehicle parts to which the target detection method and detection device according to the present embodiment are applied.

The welding device 1 includes a fixing jig (e.g., a jig of a tact system) 10 that is located at a device center part. The fixing jig 10 supports a welded door frame 11 in a fixed state in a state where, for example, an end part of an upper sash (front main frame) and an end part of an upright column sash (front upright column frame) are aligned. A relative positional relationship between the fixing jig 10 and the door frame 11 may change every time a workpiece is attached or detached, and therefore a repeatedly positioning function required for normal jigs is unnecessary (because a workpiece position of the door frame 11 is calculated based on an inverse matrix described later). Therefore, the fixing jig 10 may fix any position of the door frame 11. Note that, for a reason of ease of drawing, FIG. 4 illustrates a state where the fixing jig 10 supports the door frame 11, and FIG. 5 illustrates a state where the fixing jig 10 does not support the door frame 11 (FIG. 5 omits illustration of the door frame 11).

The welding device 1 includes a robot arm 20 and a robot arm 30 that are located on a left side and a right side, respectively, with the fixing jig 10 interposed therebetween in FIGS. 4 and 5. The robot arm 20 is configured as, for example, an arm robot that has a plurality of axes (e.g., six axes), and makes a motion (moves) to align to a predetermined portion of the door frame 11 a lock bracket (illustrated as a bubble in FIG. 4) gripped by a grip part 21 at a distal end part of the robot arm 20. Furthermore, near the grip part 21 at the distal end part of the robot arm 20, a position correction marker 22 is provided. The position correction marker 22 includes, for example, a reflector that can be tracked by a first position information generation device (laser tracker) 70 describe below. The robot arm 30 is configured as, for example, an arm robot that has a plurality of axes (e.g., six axes), and makes a motion (moves) to align to a predetermined portion of the door frame 11 a hinge bracket (illustrated as a bubble in FIG. 4) gripped by a grip part 31 at a distal end part of the robot arm 30. Furthermore, near the grip part 31 at the distal end part of the robot arm 30, a position correction marker 32 is provided. The position correction marker 32 includes, for example, a reflector that can be tracked by the first position information generation device (laser tracker) 70 describe below.

A relative positional relationship between the robot arm 20 and the lock bracket (illustrated as the bubble in FIG. 4), and a relative positional relationship between the robot arm 30 and the hinge bracket (illustrated as the bubble in FIG. 4) may change every time a workpiece is attached and detached, and therefore a repeatedly positioning function required for normal jigs is unnecessary (because workpiece grip positions of the lock bracket and the hinge bracket are calculated based on an inverse matrix described later). Hence, the robot arm 20 may grip any position of the lock bracket, and the robot arm 30 may grip any position of the hinge bracket. Relative position accuracy of the fixing jig 10 and the door frame 11, relative position accuracy of the robot arm 20 and the lock bracket, and relative position accuracy of the robot arm 30 and the hinge bracket are secured, and a device (e.g., a machine tool such as a machining center) that secures absolute positioning accuracy of a robot spatial coordinate can perform accurate positioning.

The welding device 1 includes a welding robot 40 at a position shifted in a depth direction between the fixing jig 10 and the robot arm 20, and a welding robot 50 at a position shifted in the depth direction between the fixing jig 10 and the robot arm 30. The welding robot 40 is configured as, for example, an arm robot that has a plurality of axes (e.g., six axes), and a welding nozzle 41 provided at a distal end part welds the door frame 11 supported by the fixing jig 10, and the lock bracket gripped by the grip part 21 of the robot arm 20 in a predetermined aligned state. The welding robot 50 is configured as, for example, an arm robot that has a plurality of axes (e.g., six axes), and a welding nozzle 51 provided at a distal end part welds the door frame 11 supported by the fixing jig 10, and the hinge bracket gripped by the grip part 31 of the robot arm 30 in a predetermined aligned state.

The welding device 1 includes a 3D scanner support arm 60 at a rear side of the fixing jig 10 by being sandwiched between the welding robot 40 and the welding robot 50. The 3D scanner support arm 60 is configured as, for example, an arm robot that has a plurality of axes (e.g., six axes), and has an arm distal end part provided with a second position information generation device (3D scanner) 61 and a position correction marker 62. The position correction marker 62 includes, for example, a reflector that can be tracked by the first position information generation device (laser tracker) 70 describe below.

The welding device 1 may be combined with the first position information generation device (laser tracker) 70 and used. The first position information generation device (laser tracker) 70 targets at each component of the welding device 1 (e.g., the door frame 11 supported by the fixing jig 10, the lock bracket gripped by the robot arm 20, the hinge bracket gripped by the robot arm 30, the position correction marker 22 of the robot arm 20, the position correction marker 32 of the robot arm 30, the 3D scanner 61, and the position correction marker 62 of the 3D scanner 61), and calculates three-dimensional information (position information and an angle) of each component based on a coordinate system of the first position information generation device 70.

As illustrated in FIG. 5, the welding device 1 may be combined with a shape marker (a fixed object or a metal block) 80 supported by a support base 81 and used. FIG. 5 illustrates the shape marker 80 as a simplified cubic shape for a reason of ease of drawing, and a specific configuration and function of the shape marker 80 will be described in detail later. The shape marker 80 works with the first position information generation device (laser tracker) 70 and the second position information generation device (3D scanner) 61 to use the first position information generation device (laser tracker) 70 only for initial setting (calibration), and then use the second position information generation device (3D scanner) 61 to scan (capture) the door frame 11 supported by the fixing jig 10, the lock bracket gripped by the robot arm 20, and the hinge bracket gripped by the robot arm 30.

In the present embodiment, the 3D scanner 61 with the marker is used to scan (capture) the door frame 11 supported by the fixing jig 10, the lock bracket gripped by the robot arm 20, and the hinge bracket gripped by the robot arm 30, and thereby obtain point group data (three-dimensional information) thereof. That is, the 3D scanner 61 with the marker functions as a "point group data obtaining section". Furthermore, by obtaining point groups in a state where the first position information generation device (laser tracker) 70 virtually locks onto the 3D scanner 61 with the marker, the point group data obtained by the 3D scanner 61 with the marker is calculated using the first position information generation device (laser tracker) 70 as an origin (the point group data is calculated as a virtual origin accompanying the virtual lock-on of the first position information generation device (laser tracker) 70). This point group data is expressed as, for example, the coordinates X, Y, and Z of each point and the normal directions I, J, and K of the coordinates X, Y, and Z, and an origin of the point group data is expressed by 4×4 matrix data (matrix data) (details will be described later).

In this regard, when the point group data is obtained, all of the door frame 11 supported by the fixing jig 10, the lock bracket gripped by the robot arm 20, and the hinge bracket gripped by the robot arm 30 may be not be 3D-scanned, but part of the door frame 11 supported by the fixing jig 10, the lock bracket gripped by the robot arm 20, and the hinge bracket gripped by the robot arm 30 such as only portions that serve as criteria for product evaluation may be 3D-scanned. This 3D scan may adopt a scheme that obtains a point group while moving a 2D scanner, a scheme that positions a 3D scanner to perform scanning, or a scheme that installs fixed 3D scanners at a plurality of portions to perform scanning. As described later, when point group data is matched with reference data, it is possible to set a necessary number of arbitrary positions on reference data as position references, and align the point group data and the reference data. Furthermore, it is possible to set a priority to each position reference, and prioritize alignment of a more important portion. Consequently, it is possible to control an alignment scheme of the reference data and the point group data. According to the present embodiment, when an error amount of each reference part is great, the welded parts of the lock bracket gripped by the robot arm 20 and the hinge bracket gripped by the robot arm 30 with respect to the door frame 11 are likely to interfere with each other, so that it is possible to perform positioning prioritizing fitting of shapes of the welded parts by setting a high priority to the welded parts compared to other reference parts.

Furthermore, in the present embodiment, reference data (e.g., CAD data) that serves as criteria for design of the door frame 11 supported by the fixing jig 10, the lock bracket gripped by the robot arm 20, and the hinge bracket gripped by the robot arm 30 is arranged (prepared) in advance. This reference data can include an origin (such as a vehicle origin and, in this case, origin of vehicle=origin of position information generation device), and can be data of an aligned state of the door frame 11 supported by the fixing jig 10, the lock bracket gripped by the robot arm 20, and the hinge bracket gripped by the robot arm 30. Furthermore, in the present embodiment, a control section described later is used to calculate shape fitting point group data obtained by aligning point group data with reference data including the origin (vehicle origin). Furthermore, a movement amount of movement of the point group data to the reference data, and the origins of the reference data and the shape fitting point group data are expressed by 4×4 matrix data (matrix data) (details will described later).

The origin coordinates of the shape fitting point group data are the same as coordinates obtained by moving the origin of the point group data obtained at an origin of the position information generation device. Performing inverse matrix transformation on the 4×4 matrix data (matrix) for matching the point group data with this reference data is the same as matching the reference data with the point group data, and therefore gives the origin to the point group data (a state of the shape fitting point group data expressed as an origin of the reference data is expressed in a form of a position reference of point group data). This scheme realizes giving CAD origin information to point group data without an origin.

A result of movement for matching the point group data of the door frame 11 supported by the fixing jig 10, the lock bracket gripped by the robot arm 20, and the hinge bracket gripped by the robot arm 30 with CAD data (reference data) can be expressed by (that is, is equivalent to) a matrix that indicates that the origin has been moved. The matrix is transformed into an inverse matrix to calculate a movement amount for matching the CAD data (reference data) with the point group data. Matching the point group data with the CAD data (reference data) corresponds to a square matrix, and matching the CAD data (reference data) with the point group data corresponds to the inverse matrix (, which corresponds to returning to the origin when seen from the square matrix). That is, when seen from the origin, a state where the CAD data (reference data) and the point group data are matched is moved to match the CAD coordinates with the point group data. In a case where actual workpiece arrangement of part of the door frame 11 supported by the fixing jig 10, the lock bracket gripped by the robot arm 20, and the hinge bracket gripped by the robot arm 30 can be reproduced at positions as indicated in the CAD coordinate system, the positions of part of the door frame 11, the lock bracket, and the hinge bracket are known, so that it is possible to calculate a movement amount between the origins only by calculating a matrix of other part of the door frame 11 supported by the fixing jig 10, the lock bracket gripped by the robot arm 20, and the hinge bracket gripped by the robot arm 30 (in this case, inverse matrix transformation is unnecessary).

By monitoring (continuing tracking) positions of the position correction markers 22 and 32 at all times, the first position information generation device (laser tracker) 70 assists alignment (micro driving) of the lock bracket gripped by the robot arm 20 and the hinge bracket gripped by the robot arm 30. The robot arms 20 and 30 are calibrated in advance by the first position information generation device (laser tracker) 70 and the position correction marker 22, and have improved absolute accuracy in the spatial coordinates.

When the position correction markers 22 and 32 attached to the robot arms 20 and 30 are measured, the first position information generation device (laser tracker) 70 can monitor three-dimensional coordinates at all times by replacing the vehicle origins of the lock bracket gripped by the robot arm 20 and the hinge bracket gripped by the robot arm 30 with markers. Furthermore, an operation is performed according to a difference between a marker target position and a current position, and final positions are corrected to forcibly improve spatial coordinate accuracy of the robot.

Figure 6:
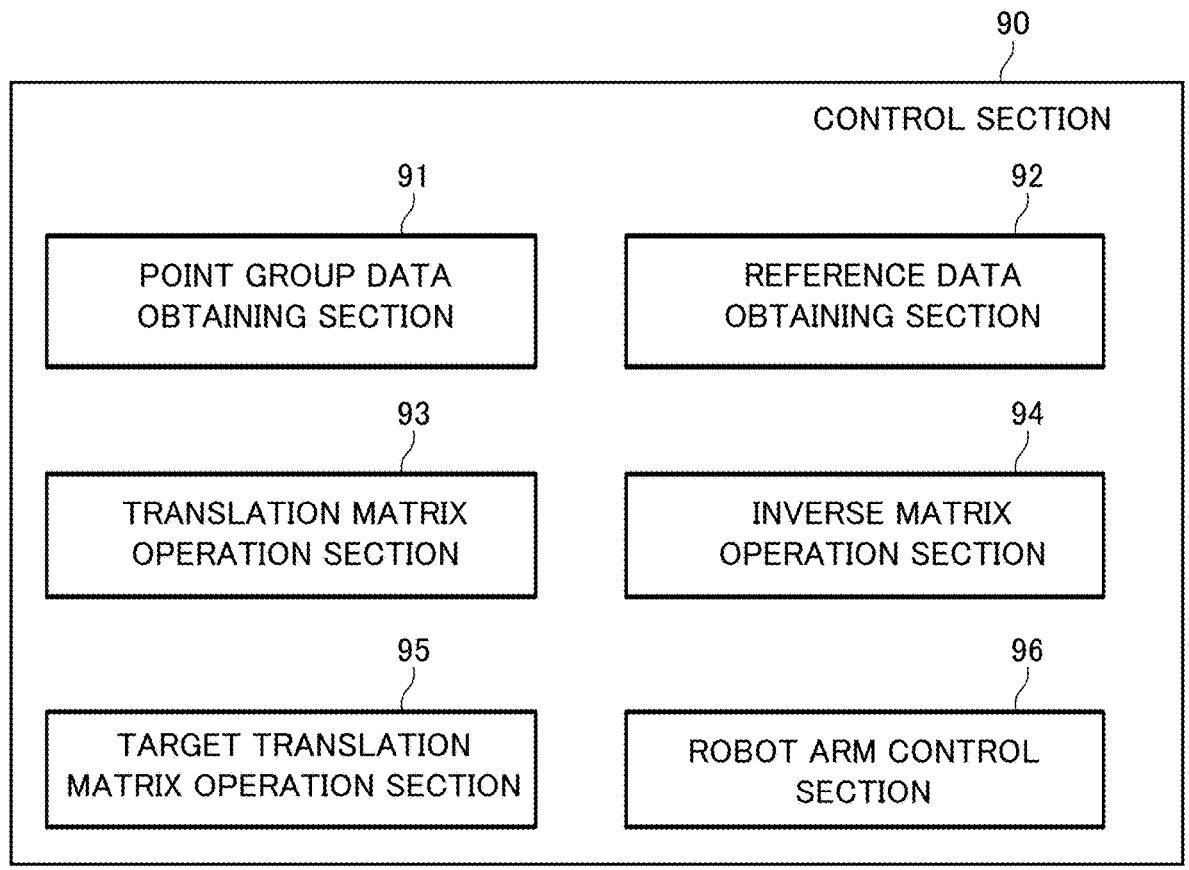
FIG. 6 is a view illustrating a third example of the configuration of the welding device for the vehicle parts to which the target detection method and detection device according to the present embodiment are applied.
Figure 7A:
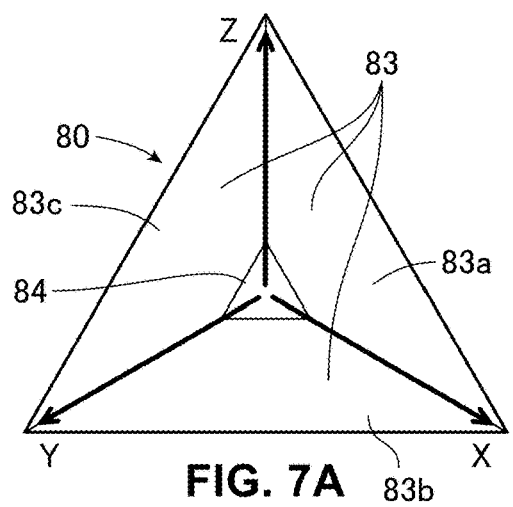
FIGS. 7A, 7B, 7C and 7D are views illustrating a first example of a shape marker.
Figure 7B:
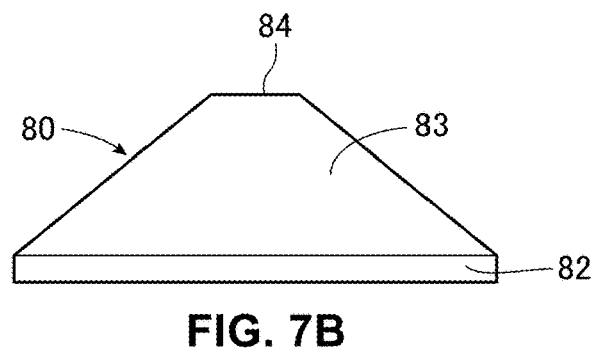
Figure 7C:
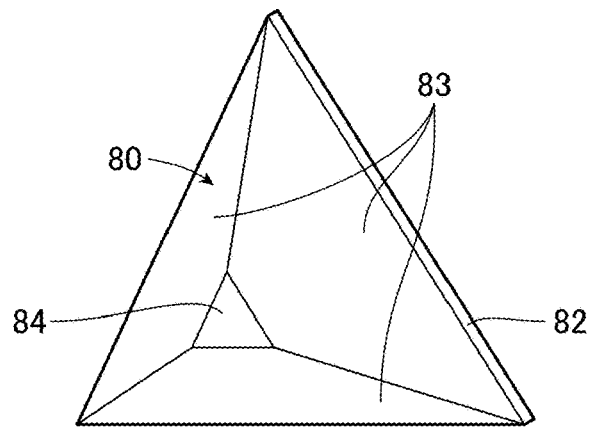
Figure 7D:
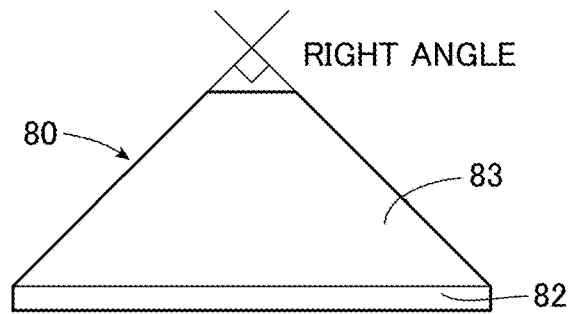

FIG. 6 is a view illustrating a third example of the configuration of the welding device 1 for the vehicle parts to which the target detection method and detection device according to the present embodiment are applied. FIG. 6 exemplifies and illustrates functional components for executing motion (movement) control of the robot arms 20 and 30 (grip parts 21 and 31) based on the above-described point group data, reference data, and shape fitting point group data. Each functional component configures part of a control section 90 that is configured as a Central Processing Unit (CPU).

The control section 90 includes a point group data obtaining section 91, a reference data obtaining section 92, a translation matrix operation section 93, an inverse matrix operation section 94, a target translation matrix operation section 95, and a robot arm control section 96.

The point group data obtaining section 91 obtains (receives an input of) point group data (three-dimensional information) of the door frame 11 supported by the fixing jig 10, the lock bracket gripped by the robot arm 20, and the hinge bracket gripped by the robot arm 30 using the first position information generation device (laser tracker) 70 and the second position information generation device (3D scanner) 61. This point group data may be point group data that uses the first position information generation device (laser tracker) 70 as an origin (virtual origin).

The reference data obtaining section 92 obtains (stores) reference data (e.g., CAD data) that serves as criteria for design of the door frame 11 supported by the fixing jig 10, the lock bracket gripped by the robot arm 20, and the hinge bracket gripped by the robot arm 30. This reference data can include an origin (such as a vehicle origin and, in this case, origin of vehicle=origin of position information generation device), and can be data of an aligned state of the door frame 11 supported by the fixing jig 10, the lock bracket gripped by the robot arm 20, and the hinge bracket gripped by the robot arm 30. The translation matrix operation section 93 performs an operation on a translation matrix for aligning the point group data with the reference data of the aligned state of the door frame 11 supported by the fixing jig 10, the lock bracket gripped by the robot arm 20, and the hinge bracket gripped by the robot arm 30. The shape fitting point group data obtained by aligning the point group data with the reference data based on the translation matrix can be obtained by this translation matrix operation.

The inverse matrix operation section 94 performs inverse matrix transformation on 4×4 matrix data (matrix) that is calculated by the translation matrix operation section 93 and is used to match the point group data with the reference data. This transformation gives the origin to the above-described point group data (a state of the shape fitting point group data expressed as an origin of reference data is expressed in a form of a position reference of point group data). This scheme realizes giving CAD origin information to point group data without an origin.

For each of the door frame 11 supported by the fixing jig 10, the lock bracket gripped by the robot arm 20, and the hinge bracket gripped by the robot arm 30, the target translation matrix operation section 95 can calculate a movement amount from the origin of one of the lock bracket and the hinge bracket to the other origin thereof by using the inverse matrix from a state where the origin (vehicle origin) is given.

The robot arm control section 96 positions the lock bracket and the hinge bracket at the door frame 11 by moving the lock bracket by the robot arm 20 and moving the hinge bracket by the robot arm 30 based on at least one of the translation matrix and the inverse matrix. More specifically, the robot arm control section 96 causes, for example, each axis (six axes) of the robot arms 20 and 30 to make a micromotion until the positioning target lock bracket and hinge bracket arrive at target positions from initial positions or current positions based on at least one of the translation matrix and the inverse matrix. An instruction value of a micromotion amount at this time is a difference between current positions and target positions of the position correction markers 22 and 32 seen from the first position information generation device (laser tracker) 70. By setting a numerical value of this micromotion amount by coefficient adjustment or the number of times of micromotions, it is possible to perform positioning that does not depend on accuracy of the robot. That is, according to the present embodiment, at two stages of (1) movement of a workpiece (grip part) based on at least one of the translation matrix and the inverse matrix (e.g., movement of one of the origins added to the lock bracket and the hinge bracket to the other one origin with one of these origins serving as a position reference based on the inverse matrix), and (2) movement of the lock bracket and the hinge bracket based on the position correction markers 22 and 32 (correction positioning using the position correction markers 22 and 32 or correction of an operation error in (1)), positioning of the workpieces (the lock bracket and the hinge bracket) is executed. In a state where the robot arm control section 96 positions the lock bracket and the hinge bracket, the welded parts of both of the lock bracket and the hinge bracket are welded by the welding robots 40 and 50.

The function of the control section 90 can be also expressed as follows. That is, the control section 90 obtains three-dimensional data (e.g., point group data), and obtains relative position data (e.g., reference data) of a hand and workpieces. The control section 90 executes spatial positioning processing for fitting best the obtained three-dimensional data (e.g., point group data) and the relative position data (e.g., reference data). The control section 90 outputs a movement amount coordinate value of the workpieces by the hand. The control section 90 executes motion (movement) control of the hand and the workpieces by calculation of the six axes based on robot inverse kinetics.

The positioning processing according to the present embodiment is executed by, for example, following steps. First, the point group data of the lock bracket and the hinge bracket is aligned with the CAD data (reference data), and movement amounts of the lock bracket and the hinge bracket are output based on translation matrices that are 4×4 matrix data (matrix data). By this means, shape fitting point group data obtained by aligning the point group data with the reference data based on the translation matrix is obtained for the lock bracket and the hinge bracket. Furthermore, the point group data of the door frame 11 is aligned with the CAD data (reference data), and a movement amount of the door frame 11 is output based on a translation matrix that is the 4×4 matrix data (matrix data). By this means, shape fitting point group data obtained by aligning the point group data with the reference data based on the translation matrix is obtained for the door frame 11. Furthermore, an inverse matrix operation is executed based on the calculated translation matrices to give the origin to the point group data. That is, the one origin serves as the position reference to match the other origin the one origin. Alternatively, the shape fitting point group data may be moved to move the origin (vehicle origin) of the reference data together, and match the moved origins of the lock bracket, the hinge bracket, and the door frame 11. Furthermore, the calculated inverse matrices are used to give coordinate values (e.g., CAD coordinates) to the point group data of the lock bracket, the hinge bracket, and the door frame 11. Furthermore, a movement amount of the point group data is calculated in a coordinate system whose origin (vehicle origin) is a position reference, and the robot arms 20 and 30 that grip the lock bracket and the hinge bracket are moved based on the calculated movement amounts to position the lock bracket and the hinge bracket at the door frame 11. According to the present embodiment, the door frame 11 is fixed, and the lock bracket and the hinge bracket are movable, and therefore the movement amounts correspond to movement amounts of the lock bracket and the hinge bracket with respect to the door frame 11 (movement amounts from the CAD coordinates of the lock bracket and the hinge bracket to the CAD coordinates of the door frame 11). Lastly, the lock bracket and the hinge bracket are moved with respect to the door frame 11 based on the calculated movement amounts of the lock bracket and the hinge bracket with respect to the door frame 11 to position the lock bracket and the hinge bracket with respect to the door frame 11.

A process of aligning point group data with reference data according to the present embodiment includes, for example, a forced numerical value movement step of performing forced numerical value (quantitative value) movement on point group information, a best fit step for entire shape fitting of aligning an entire point group and an entire CAD shape, and a reference alignment step of performing detailed alignment with a reference portion such as a portion that serves as criteria for product evaluation.

By the way, for example, it is considered to correct the final positions of the lock bracket and the hinge bracket with respect to the door frame 11. Conventionally, the final positions are corrected by calculating a position and a posture by a combination of the first position information generation device (laser tracker) and the position correction markers of the robot arms. That is, the first position information generation device (laser tracker) captures a reflector part (point) of the position correction marker to calculate a distance r from the first position information generation device (laser tracker) to the reflector part, obtain a left/right direction rotation angle θ and an upper/lower direction rotation angle φ of a head of this first position information generation device (laser tracker) from an encoder, thereby calculate polar coordinates with respect to the reflector part with the first position information generation device (laser tracker) serving as a position reference, and transform the polar coordinates into orthogonal coordinates (x, y, z). For example, the distance is measured like a laser displacement meter, the laser displacement meter is installed in a rotary table of two orthogonal axes, a rotation angle encoder value of the two-axis rotary table at which the laser displacement meter faces is output, and calculated polar coordinates are transformed into orthogonal coordinates. Furthermore, the first position information generation device (laser tracker) captures a plurality of (e.g., 11) LEDs provided to the position correction marker to obtain posture information (Rx, Ry, and Rz). A camera function of the first position information generation device (laser tracker) is used to check an arrangement of the plurality of LEDs, and a posture is calculated based on the arrangement of the plurality of LEDs.

However, the first position information generation device (laser tracker) has high accuracy, yet is very costly to the contrary, and dedicated markers are optional accessories for the first position information generation device (laser tracker) and therefore tend to become costly. Therefore, in a case where, for example, the dedicated first position information generation device (laser tracker) and position correction markers are provided to each of a plurality of manufacturing lines and facilities, the overall manufacturing lines cannot help but becoming highly costly.

Hence, in the present embodiment, final position correction such as final position correction of the lock bracket and the hinge bracket with respect to the door frame 11 is performed on parts whose final positions do not significantly change by a combination of the second position information generation device (3D scanner) 61 and the shape marker 80 without using the first position information generation device (laser tracker) and the dedicated markers. Consequently, it is not necessary to provide the dedicated first position information generation device (laser tracker) and position correction markers to each of a plurality of manufacturing lines, and commonly use a 3D scanner for the plurality of manufacturing lines. Furthermore, as for a facility that has a plurality of positioning processes that wait for the first position information generation device (laser tracker) to perform measurement, it is possible to multiply perform position information generation and positioning calculation processing simultaneously by disposing a plurality of the second position information generation devices (3D scanners). As a result, it is possible to achieve cost reduction and a higher speed of each manufacturing line and eventually the overall manufacturing lines.

FIGS. 7A to 7D are views illustrating a first example of the shape marker (the fixed object and the metal block) 80. In FIGS. 7A to 7D, the shape marker 80 has a triangular pyramidal shape. The shape marker 80 has a base part 82 that forms a right triangular shape seen from a face of reference numeral 83a (when seen from, for example, a direction vertical to the face of reference numeral 83a), three side surface parts 83 that extend to a center part of the right triangular shape in plan view, and a top surface part 84 of the right triangular shape that is formed by cutting a joined part of the three side surface parts 83 and is seen from the face of reference numeral 83a (when seen from, for example, the direction vertical to the face of reference numeral 83*a*). The base part 82 and the top surface part 84 have similar right triangular shapes in plan view. The partial planar part 83*a* may be provided to specify which coordinate axis faces where at a time of extraction of coordinates described later. Alternatively, means for specifying an orientation of each coordinate axis may be any means such as means for specifying a coordinate axis by classifying part of faces by colors. That is, the shape including the triangular pyramidal shape includes a shape including the top surface part 84 as illustrated in FIGS. 7A to 7D, too.

Figure 8:
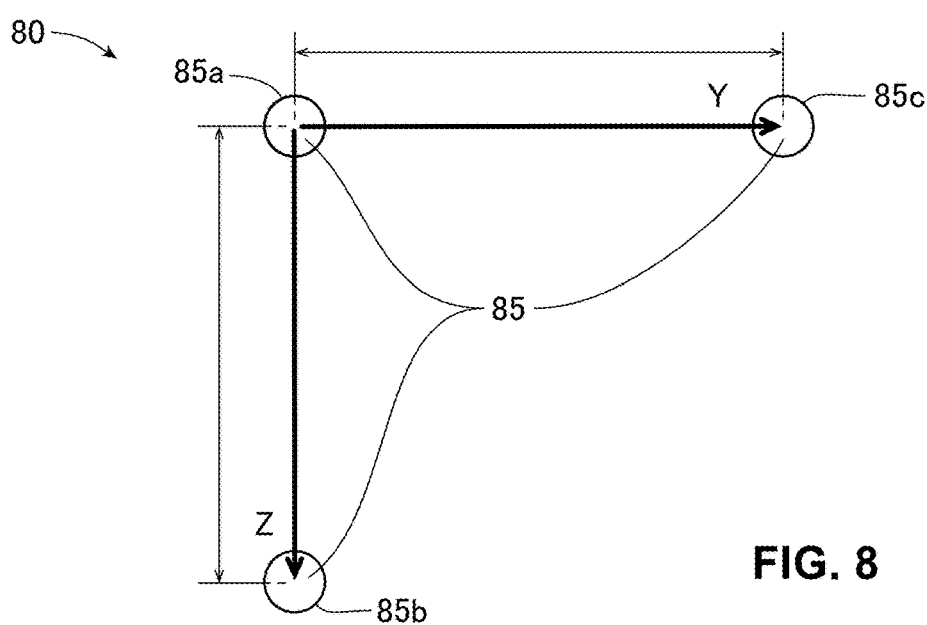
FIG. 8 is a view illustrating a second example of a shape marker.

FIG. 8 is a view illustrating a second example of the shape marker (the fixed object and the metal block) 80. In FIG. 8, the shape marker 80 includes shapes of three balls 85. One of the three balls 85 makes it possible to grasp a position of a target, and the three balls 85 make it possible to grasp a posture of the target. By connecting points defined by the three balls 85, it is possible to grasp the position and the posture of the target in spatial coordinates (three-dimensional coordinates) based on the mutually orthogonal X axis, Y axis, and Z axis. The three balls may be arranged such that dimensions of the three balls are different to specify which coordinate axis faces where at a time of extraction of coordinates described later. Alternatively, means for specifying an orientation of each coordinate axis may be any means such as means for specifying a coordinate axis by classifying part of faces by colors.

The shapes of the shape marker 80 illustrated in FIGS. 7A to 7D and 8 are merely examples, and the design thereof can be variously changed. The shape marker 80 may be a shape marker that make it possible to grasp a position and a posture of a target at spatial coordinates (three-dimensional coordinates) based on the mutually orthogonal X axis, Y axis, and Z axis. For example, as for a marker including the triangular pyramidal shape in FIGS. 7A to 7D, by calculating an intersection line at which an average plane of a point group of 83*a* and an average plane of a point group of 83*b* intersect as the X axis from both of the average planes, calculating an intersection line at which the average plane of the point group of 83*b* and an average plane of a point group of 83*c* intersect as the Y axis from both of the average planes, and calculating the remaining Z axis from a relationship of the X axis and the Y axis, it is possible to specify the posture of the shape marker 80. When the shape marker 80 rotates in this state, it is probable according to calculation that the orientations of the X axis, the Y axis, and the Z axis cannot be grasped, and therefore the above-described shape difference for specifying an orientation of a marker makes it possible to accurately calculate a posture by defining a part of the shape difference as a Z axis direction even when the shape marker 80 rotates. A position can be calculated from intersections of the average planes of point groups of 83*a*, 83*b*, and 83*c*. In this case, this intersection may be projected on the top surface part 84, and position information of this intersection may be used. 3D scan has a feature that it is possible to obtain more accurate point group information from point group information obtained normally than from point group information obtained by scanning an inclined surface, so that it is possible to reduce a position error by additionally performing this processing in between. As for the balls in FIG. 8, by differing dimensions between three balls 85*a*, 85*b*, and 85*c* instead of equally arranging the balls, it is possible to specify an X axis, Y axis, or Z axis direction, and specify the orientation of the shape marker 80. Note that the dimensions between the three balls 85*a*, 85*b*, and 85*c* have a degree of freedom, and the design thereof can be variously changed.

Note that the shape marker 80 may be provided at distal end sides of the robot arms 20 and 30 that grip workpieces (e.g., the lock bracket and the hinge bracket). In this case, the shape marker 80 may be provided instead of/in addition to the position correction markers 22 and 32 of the robot arms 20 and 30. Furthermore, the shape marker 80 may be provided to other predetermined portions.

Figure 9:
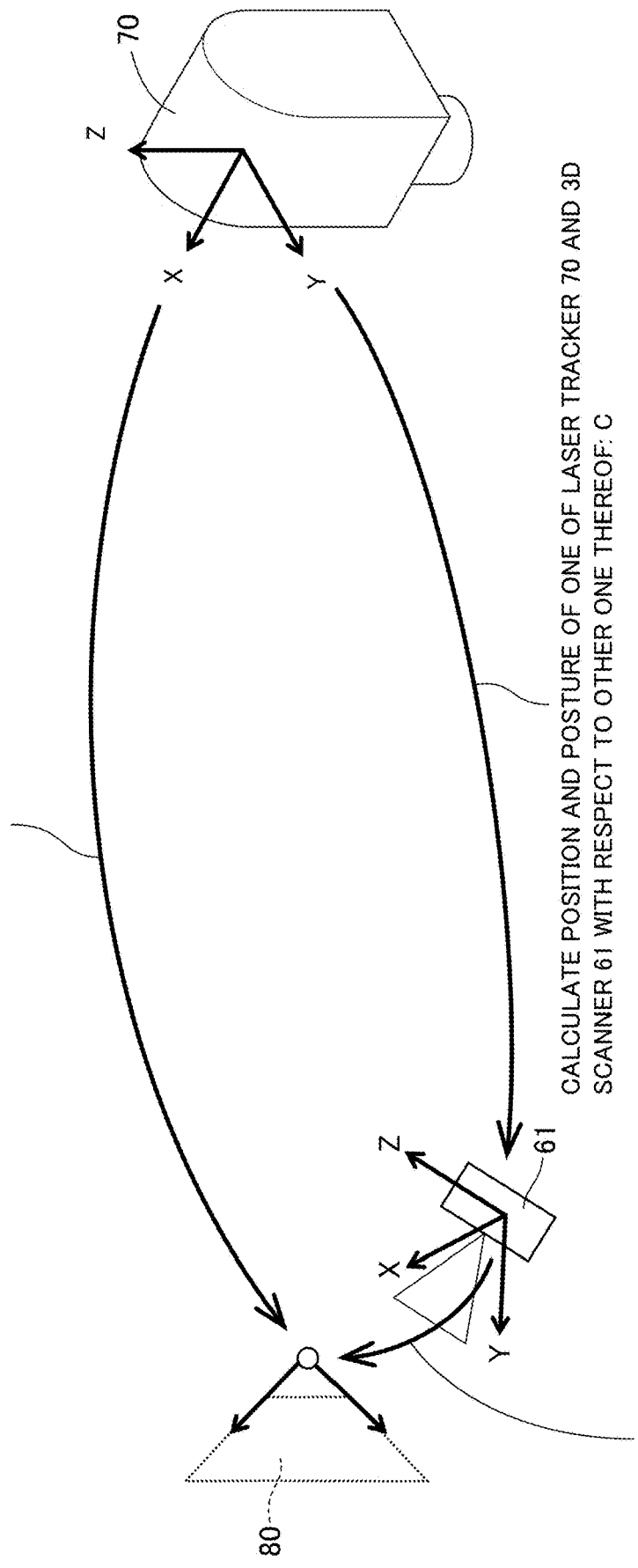
FIG. 9 is a view illustrating an example of advance preparation processing for correcting a final position using a 3D scanner and a shape marker.

FIG. 9 is a view illustrating an example of advance preparation for performing final position correction processing using the 3D scanner 61 and the shape marker 80. First, the first position information generation device (laser tracker) 70 performs robot position measurement and calibration. At a stage of this system processing, the position correction markers 22 and 32 are used.

As illustrated in FIG. 9, the first position information generation device (laser tracker) 70 is used to measure a position and a posture of the shape marker 80 that is a first target (A). Means in this case may be any means such as a method for performing measurement using a reflector, a method for performing measurement using a touch probe with a marker, a method for performing measurement using a 3D scanner with a marker, or the like as long as this means can specify the position and the posture of the shape marker 80 in a coordinate system of the first position information generation device (laser tracker). The second position information generation device (3D scanner) 61 is used to measure the position and the posture of the shape marker 80 that is the first target (B). A position and a posture of one of the first position information generation device (laser tracker) 70 and the second position information generation device (3D scanner) 61 with respect to the other one thereof is calculated (C) based on a positional relationship between the position and the posture of the shape marker 80 as the first target measured by the first position information generation device (laser tracker) 70 (A), and the position and the posture of the shape marker 80 as the first target measured by the second position information generation device (3D scanner) 61 (B). That is, a point group of data captured by the second position information generation device (3D scanner) 61 appears at the origin of the second position information generation device (3D scanner) 61, and coordinates extracted from the point group are matched to calculate the position and the posture of the second position information generation device (3D scanner) 61 from the origin of the first position information generation device (laser tracker) 70. Furthermore, by calculating the position and the posture of one of the first position information generation device (laser tracker) 70 and the second position information generation device (3D scanner) 61 with respect to the other one thereof, it is possible to detect a position and a posture of a second target from the origin of the first position information generation device (laser tracker) 70 using the second position information generation device (3D scanner) 61. In this regard, the second target may be, for example, markers (e.g., other shape markers 80' that are different from that illustrated in FIG. 4 and are not illustrated) that are provided at the distal end sides of the robot arms 20 and 30 that grip workpieces, and predetermined portions of all other detection targets. That is, at least one of the first target and the second target can include triangular pyramidal shapes (see FIGS. 7A-7D) or the shapes of the three balls (see FIG. 8) of the shape markers 80 and 80'.

By calculating the position and the posture of one of the first position information generation device (laser tracker) 70 and the second position information generation device (3D scanner) 61 with respect to the other one thereof, detecting the position and the posture of the second target using the second position information generation device (3D scanner) 61 corresponds to generating a moved position and posture during the final position correction of the lock bracket and the hinge bracket with respect to the door frame 11. According to this final position correction processing, by detaching the first position information generation device (laser tracker) 70, and using the origin of the first position information generation device (laser tracker) 70 as the virtual origin, the second position information generation device (3D scanner) 61 measures the position and the posture of the second target. At this time, the second position information generation device (3D scanner) 61 used for final position correction may be moved as needed to widen an image capturing range. A way to move the second position information generation device (3D scanner) 61 in this case is desirably a mode that is operated with the number of axes that perform highly accurate linear motion or perform rotation as little as possible since point group accuracy remarkably lowers in a case of a device such as a six-axis robot that has a significant error of absolute spatial coordinates. Naturally, the second position information generation device (3D scanner) 61 may be used in a fixed state.

The above series of processing is executed at a time of calibration of the final position correction. In other words, the first information generation device (laser tracker) 70 is necessary only at a time of regular calibration, and the first position information generation device (laser tracker) 70 can be detached in other situations. Consequently, it is not necessary to provide the dedicated first position information generation device (laser tracker) 70 to each of pluralities of manufacturing lines or facilities, and commonly use the first position information generation device (laser tracker) 70 between the pluralities of manufacturing lines or facilities.

As described above, a target detection method according to the present embodiment includes: a step of, at a first position information generation device, measuring a position and a posture of a first target; a step of, at a second position information generation device, measuring the position and the posture of the first target; a step of calculating a position and a posture of one of the first position information generation device and the second position information generation device with respect to other one thereof based on a positional relationship between the position and the posture of the first target measured by the first position information generation device, and the position and the posture of the first target measured by the second position information generation device; and a step of, at the second position information generation device, measuring a position and a posture of a second target using the position and the posture of one of the first position information generation device and the second position information generation device with respect to other one thereof. Consequently, it is possible to detect a target by a simple method and configuration. By performing final position correction using the 3D scanner and the shape markers, it is possible to commonalize a costly laser tracker between a plurality of manufacturing lines or facilities, and reduce cost without providing an individual laser tracker to each manufacturing line (laser tracker less).

This application claims priority to Japanese Patent Application No. 2022-048767 filed on Mar. 24, 2022, the entire contents of which are incorporated by reference herein.

The invention claimed is:
1. A target detection method comprising:
a step of, at a first position information generation device, measuring a position and a posture of a first target;
a step of, at a second position information generation device, measuring the position and the posture of the first target;
a step of calculating a position and a posture of one of the first position information generation device and the second position information generation device with respect to other one of the first position information generation device and the second position information generation device based on a positional relationship between the position and the posture of the first target measured by the first position information generation device, and the position and the posture of the first target measured by the second position information generation device; and
a step of, at the second position information generation device, measuring a position and a posture of a second target using the position and the posture of the one of the first position information generation device and the second position information generation device with respect to the other one of the first position information generation device and the second position information generation device.

2. The target detection method according to claim 1, wherein at least one of the first target and the second target includes a triangular pyramidal shape.

3. The target detection method according to claim 1, wherein at least one of the first target and the second target includes shapes of three balls.

4. The target detection method according to claim 1, wherein the second target is provided at a distal end side of a robot art that grips a workpiece.

5. The target detection method according to claim 1, further comprising a step of, at the second position information generation device, measuring the position and the posture of the second target by detaching the first position information generation device, and using the second position information generation device that uses an origin of the first position information generation device as a virtual origin.

6. The target detection method according to claim 1, wherein
the first position information generation device is a laser tracker, and
the second position information generation device is a 3D scanner.

7. A target detection device comprising:
a first position information generation device that measures a position and a posture of a first target; and
a second position information generation device that measures the position and the posture of the first target, wherein
a position and a posture of one of the first position information generation device and the second position information generation device with respect to other one of the first position information generation device and the second position information generation device is calculated based on a positional relationship between the position and the posture of the first target measured by the first position information generation device, and the position and the posture of the first target measured by the second position information generation device, and
the second position information generation device measures a position and a posture of a second target using the position and the posture of the one of the first position information generation device and the second position information generation device with respect to the other one of the first position information generation device and the second position information generation device.

\* \* \* \* \*